United States Patent [19]
Mattson et al.

[11] Patent Number: 5,229,934
[45] Date of Patent: Jul. 20, 1993

[54] POST-PROCESSING TECHNIQUE FOR CLEANING UP STREAKS AND ARTIFACTS IN DIAGNOSTIC IMAGES

[75] Inventors: Rodney A. Mattson, Mentor; Heang K. Tuy, Chesterland, both of Ohio

[73] Assignee: Picker International, Inc., Highland Hts., Ohio

[21] Appl. No.: 539,134

[22] Filed: Jun. 18, 1990

[51] Int. Cl.$^5$ ............................................. A61B 6/02
[52] U.S. Cl. ............................. 364/413.21; 378/901; 364/413.14
[58] Field of Search ............... 364/413.19, 414; 378/4, 378/901; 382/54

[56] References Cited

U.S. PATENT DOCUMENTS

| | | | |
|---|---|---|---|
| 4,272,820 | 6/1981 | Lux | 364/413.19 |
| 4,712,178 | 12/1987 | Tuy | 364/413.19 |
| 4,769,757 | 9/1988 | Horiba et al. | 364/413.19 |

*Primary Examiner*—Emanuel S. Kemeny
*Attorney, Agent, or Firm*—Fay, Sharpe, Beall, Fagan, Minnich & McKee

[57] ABSTRACT

A CT or other radiographic scanner (A) generates data that is arranged into sets (32). Each set is convolved (40) with a convolution function (42) and backprojected (44) into an image memory (46) along a corresponding one of a plurality of rays. A corresponding gradient image (52) in which each pixel value has either a one or a zero value is forward projected (54) and compared (60) with a standard. The comparison indicates along which rays data sets including bad data were projected. To subtract the bad data contribution from the image, the image representation is forward projected (90) along the identified rays, convolved (40) with a negative of the convolution function (84), and backprojected (44) along the identified ray into the image memory (46). Further correction may be obtained by replacing the subtracted data with interpolated data. To this end, the image representation is again forward projected (90) along the identified ray, convolved (40) with the original selected convolution function (42), and backprojected (44) into the image representation (46) along the identified ray.

20 Claims, 2 Drawing Sheets

POST-PROCESSING TECHNIQUE FOR CLEANING UP STREAKS AND ARTIFACTS IN DIAGNOSTIC IMAGES

BACKGROUND OF THE INVENTION

The present invention relates to the art of image processing. It finds particular application in conjunction with cleaning up images generated by computerized tomographic scanners and will be described with particular reference thereto. However, it is to be appreciated that the invention may also find application in conjunction with other diagnostic images, particularly images generated using a convolution and backprojection or analogous processing technique.

Each CT scanner image conventionally represents a plane about one or one and a half millimeters to ten millimeters thick through the subject. For greater diagnostic value, a series of images are commonly generated, each representing an adjacent or closely adjacent plane.

To provide images with good resolution, there are a large multiplicity of samplings per image. In fourth generation scanners, the scan circle may be surrounded by one thousand, two thousand, four thousand, or more detectors, about a quarter of which are irradiated at any given time. The irradiated detectors are repeatedly sampled as the x-ray source rotates about the examination region. Thus, a very large number of data samplings are generated per image. Several images, e.g. ten or twenty, may be generated per study. In order to freeze the region of interest of the subject and eliminate motion defects, the multiple images are generated as quickly as possible.

The multiple samplings are assembled into data lines which are convolved and backprojected into an image representation. Various processing techniques have been developed in order to generate the resultant images quickly. Various hardware advantages and cost reductions are achieved when the data lines or views are processed as fast as they are generated. This enables the massive amount of raw data values which are used to construct the series of images for each diagnostic study to be discarded as each is processed. Rather than saving raw data, only the series of images, which also represents a massive data storage commitment, is retained.

From time to time, one of the thousands of detectors in the scanner array will go bad and give an aberration at each sampling. When these bad data values are convolved and backprojected with the multiplicity of good data values, streaks are caused in the resultant image. These streaks disrupt the resultant image and often render them useless for diagnostic purposes. Moreover, when a detector goes bad, or intermittently puts out bad data, all of the images within a single study are commonly affected.

The simple solution to a set of streaked diagnostic images is to put the patient back in the scanner and generate a new set. However, this is not always advisable or even possible. In some studies, a contrast agent is injected into the patient's blood as a part of the diagnostic scanning procedure. To get good contrast, it may be necessary to wait for the first dose of contract agent to be out of the patient's system. Further, it is advantageous to minimize patient dosage of the contrast agents to avoid any potential physiological reactions to the agents. In other instances, the patient has already left the hospital or facility. The scanner and scanning procedure is in many instances conducted by a technician to generate the set of diagnostic images which are reviewed at a different location or at a different time by the radiologist. Also, it may not be advisable to re-radiate the patient by conducting another scanning procedure.

SUMMARY OF THE INVENTION

In accordance with the present invention, the new and improved image post processing method and apparatus are provided which enables the streaks to be removed from the images.

In accordance with a more limited aspect of the present invention, the bad rays in the raw data are identified. The bad image data is replaced with interpolated data.

In a more limited aspect of the invention, image pixel values caused by each identified bad ray are removed and replaced by interpolated data based on surrounding pixels.

In accordance with another more limited aspect of the present invention, the bad rays of data are forward projected from the resultant image, convolved with the negative of the original or appropriate convolution function and backprojected. This effectively subtracts the bad ray contribution to the image.

In accordance with a yet more limited aspect of the present invention, after the bad ray data has been subtracted by convolving with a negative of the convolution function and backprojection, the image is again forward projected along the bad ray. The forward projected data is then convolved with the original or appropriate convolution function and backprojected into the image representation. In this manner, the bad ray data is replaced with interpolated data values which are related to the overall image data by backprojection, convolution, and forward projection algorithms.

In accordance with another aspect of the present invention, means are provided for performing the above discussed steps.

One advantage of the present invention is that it enables streaked images to be cleaned up.

Another advantage of the present invention is that minimizes data storage memory capacity. Raw data need not be saved in order to clean up streaked images.

Another advantage of the present invention resides in its simplicity. The procedure can be performed automatically with little or no input from the technician or radiologist.

Still further advantages will become apparent to those of ordinary skill in the art upon reading and understanding the following detailed description.

BRIEF DESCRIPTION OF THE DRAWINGS

The invention may take form in various steps and arrangements of steps or in various components and arrangements of components. The figures are only for purposes of illustrating a preferred embodiment and are not to be construed as limiting the invention.

DETAILED DESCRIPTION OF THE PREFERRED EMBODIMENTS

Figure 1:
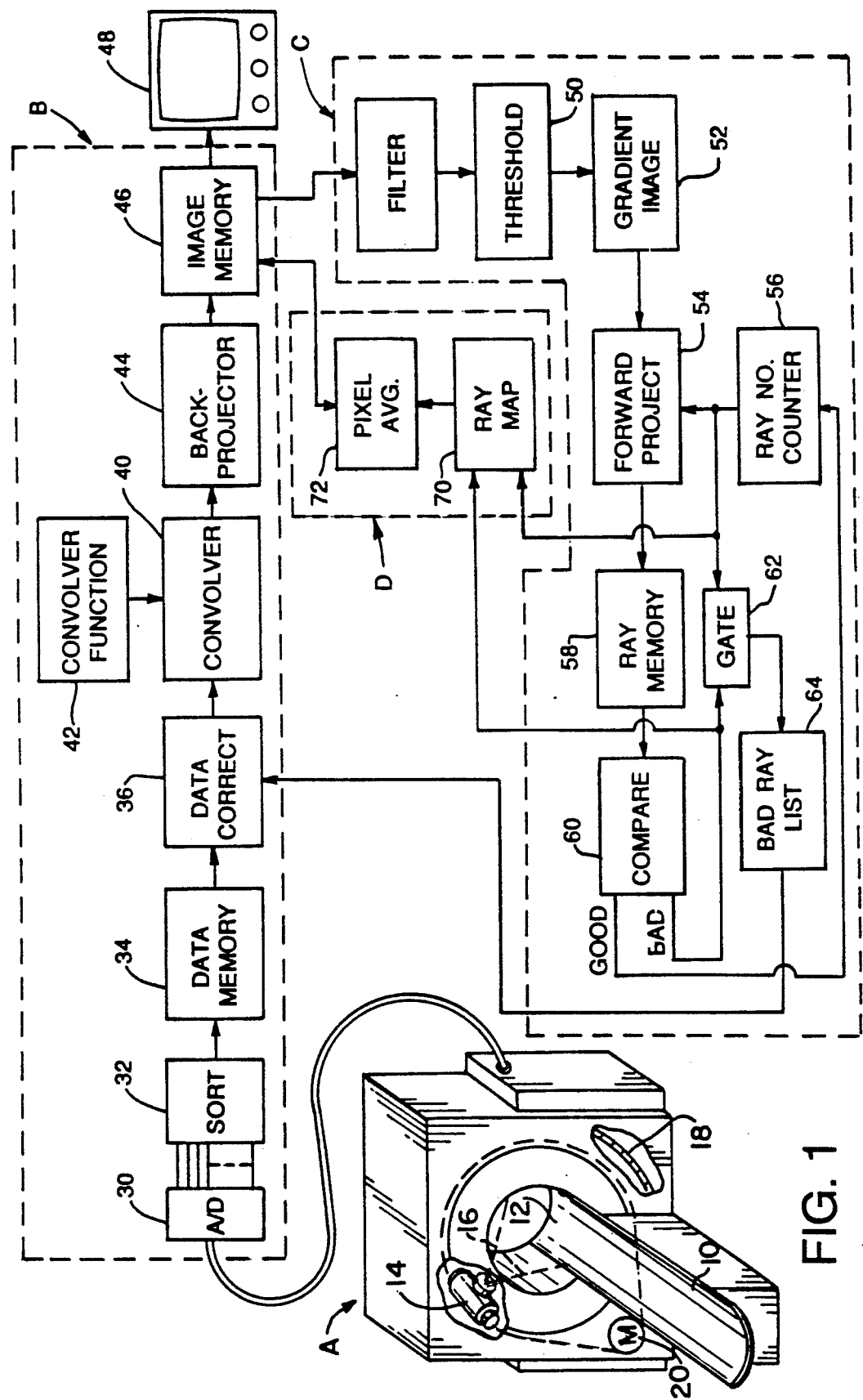
FIG. 1 is a diagrammatic illustration of a CT scanner system including image processing components for processing diagnostic images and components for post-processing the images to clean up streaks.

With reference to FIG. 1, a CT scanner includes a non-invasive examination means A for generating raw data concerning a patient or subject being examined. An image processing means B processes the generated raw data into an electronic image representation. A defective or bad data identifying means C examines the image representation and identifies the bad data responsible for any streaking or analogous artifacts. An image post processing or correction means D processes data from the image representation to reduce or eliminate the streaks and analogous artifacts.

The non-invasive examination means A includes a patient couch 10 or other means for supporting a region of a subject or patient of interest in an examination region 12. A source of penetrating radiation, such as an x-ray tube 14 transmits a fan beam 16 of the penetrating radiation through one or more slices of the examination region 12. After traversing the region of interest of the subject that is disposed in the examination region 12, the penetrating radiation impinges on radiation detectors 18.

In a fourth generation scanner, for example, the radiation detectors are arranged side by side in a circular ring around the examination region. In order to collect a plurality of slices concurrently, one or more additional rings of detectors may be placed next to each other. Each ring typically has a large number of detectors, such as 600, 1200, 2400, 4800, or the like. Typically, each detector or detector channel includes a scintillation crystal which converts the penetrating radiation into optical energy. A photodiode is optically coupled with the scintillation crystal to convert the optical energy into a corresponding electrical signal. A preamplifier is commonly mounted immediately contiguous to the photodiode to amplify the output signal. Other detector constructions may also be utilized, such as photomultiplier tubes, solid state devices for converting penetrating radiation directly into corresponding electrical signals, and the like.

Each channel may be sampled to obtain the instantaneous or current output of the amplifier. Alternately, an integrator, such as a capacitor, may be incorporated in each channel to integrate the optical energy between samplings. Bad data can be caused by any one of these components going bad, a loose wiring connection, or even downstream components, such as channels of an analog-to-digital converter, going bad. The bad data could take the form of a constant zero output, an intermittent zero or high output, noise or static superimposed on otherwise good data, and the like.

A penetrating radiation beam rotating means 20 rotates the beam of radiation around the examination region. The rotation may be continuous, continuous over a plurality of slices, or may rotate during the collection of each image and return between slices.

The image processing means B includes an analog-to-digital converter 30 for digitizing each sampled raw data value. In a source fan beam reconstruction scheme, the concurrently sampled raw data values from the irradiated detectors constitutes a data set or data line. In a detector source reconstruction scheme, a data reorganizing or sorting means 32 reorganizes the raw data such that each data line or set corresponds to the multiple, time displaced samplings of the same detector as the radiation source moves behind the examination region 12 from it.

A data memory means 34 stores one or more data sets, as may be appropriate to the speed of the image processing hardware. Optionally, a data correction means 36 may be provided for correcting the raw data to remove the effects of detectors which are known to be bad. For example, in a source fan reconstruction scheme, the raw data value corresponding to a bad detector channel is replaced by a value interpolated from adjoining data line values. In a detector fan reconstruction scheme, the data line corresponding to a bad detector is replaced by an interpolation of data lines from adjacent detectors. The interpolation may be a simple averaging of the closest data values to either side or a more complex weighting which adds contributions from more distant points.

A convolver means 40 convolves each data set with a filter or convolution function or algorithm stored in a convolution function memory 42 to generate a convolved data line. Each convolved data set is backprojected by a backprojection means 44 into an image memory means 46. The backprojection means, as is known in the art, adds an appropriate contribution from each convolved data line to each pixel of a two dimensional pixel array defined by the image memory means. When all of the data lines have been convolved and backprojected into the image memory 46, the stored values represent an image of a slice through the examination region. Typically, the magnitude of the data stored corresponding to each pixel represents the radiation absorptive (or transmissive) properties of the tissue in a corresponding region of the slice through the examination region. The image representation may be converted to a man-readable display by a video monitor 48, photographic camera, printer, or the like. Alternately, the image representations may be stored on a transportable medium, such as an optical disk or magnetic storage medium for later review, may be transmitted electronically to another site within the medical facility for review, be subject to further processing and manipulation, such as to produce a cinematographic type moving image from a series of time displaced images through the same slice, or the like.

The bad data identifying means c may be activated by the radiologist or technician upon noting an offensive streak or may review all images automatically to remove both readily apparent streaking and subtle artifacts. A threshold means 50 compares the magnitude of the gradient of each pixel value in the image memory with a preselected threshold. The threshold may be determined by trial and error to produce an optimal balance between the removal of streaks and the retention of an original image distinctiveness. Each pixel is assigned a one or a zero value depending on whether its gradient is above or below the threshold value and loaded into a gradient image memory means 52. Optionally, running average filters, neighborhood filters, and the like may be utilized in conjunction with the threshold to identify sudden intensity changes more accurately. A forward projecting means 54 is indexed by a ray number counter 56 to forward project a data set along each ray of the gradient image representation in the gradient image memory 52. A suitable backprojector and forward projector is illustrated in U.S. patent application Ser. No. 276,859, the disclosure of which is incorporated herein by reference. It should be appreciated that forward projection is not the mathematical inverse of backprojection, but rather is its adjoint. Forward projection is more nearly the inverse of the combination of convolution and backprojection. Thus, each forward projected ray that is received by a ray memory or latch 58 is conceptually an ideal data set that has been fully processed and is free of any aberrations and is ready for the convolution operation.

A comparing means 60 compares each forward projected ray of the gradient image with a standard to determine whether the ray represents good or bad data. For example, the digital values of the gradient image ray may be summed, and the sum compared with a threshold value. Again, the threshold may be iteratively adjusted to optimize the balance between bad data removal and retention of image clarity. If the ray is good, the comparing means 60 indexes the ray counter 56 and the process is repeated for the next ray of the image. The number of rays is selected to match the number of initial data sets which are generated by the selected non-invasive examination means configuration.

If the comparing means determines that the ray is bad, it controls a gate means 62 to convey the bad ray number or identification to a bad ray memory means 64. The bad ray identifications in the bad ray memory means 64 are addressed by the data correction means 36 to remove the contribution from the corresponding bad detector in subsequent images. Of course, one identification of a bad ray may not conclusively prove that the corresponding detector is bad. Accordingly, a counter or statistical analysis means may be provided to determine the number of times or frequency with which a ray is identified as bad.

The image correcting means D includes a ray map 70 which maps a correspondence between each ray and the pixels of the image representation. The ray map is addressed by each bad ray number and a corresponding identification of the affected pixels is generated. A pixel averaging means 72 replaces each of the identified affected pixels with an interpolation derived from adjoining pixels, particularly adjoining pixels which are unaffected by the bad ray. The interpolation may be a simple averaging of the closest pixels, a weighted averaging that provides a contribution for more distant pixels, or the like. In this manner, each pixel that is affected by a bad detector or other cause of streaking is replaced by a value interpolated from unaffected pixel values.

Figure 2:
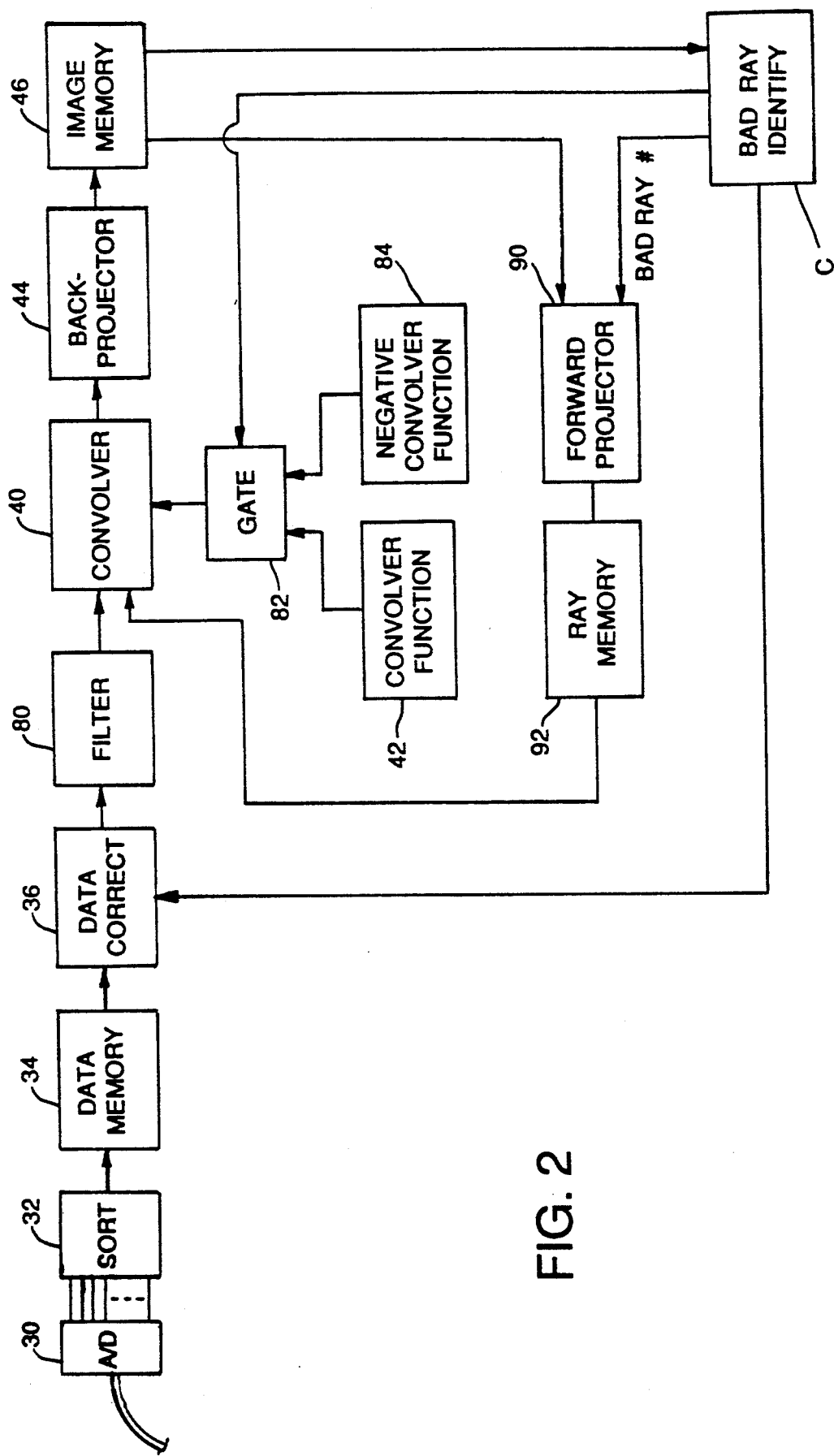
FIG. 2 is a diagrammatic illustration of an alternate embodiment for post-processing images.

With reference to FIG. 2, raw data signals generated by the non-invasive examination means A are digitized, sorted in their appropriate data lines or data sets. Data from any detectors previously identified as bad are removed by the data correcting means 36. A filter or smoothing function 80 may optionally smooth or process each data set before it is processed by the convolver 40. A gate means 82 selectively connects the convolver 40 with either the selected algorithm stored in convolution algorithm memory 42 or the negative of the convolution function which is negated by a negating means or stored in its negative form in a negative algorithm memory 84. The negative convolution function and the positive convolution function when convolved with the same data line and operated on with the backprojector 44 provide the same backprojected output except that the data convolved with the negative convolution is the negative or opposite of the data convolved with the other convolution function. In this manner, convolving a data set once with a positive function and backprojecting it in the image memory adds its contribution to the image. Processing the same data set again but convolved with the negative function and backprojecting it into the image memory subtracts or removes that data line's contribution to the resultant image.

The bad ray identifying means 0 again examines the data in the image memory means 46 and identifies which rays are causing the streaking, rings, or other artifacts. The bad ray identifying means may have the same construction as illustrated in FIG. 1 or may utilize other similar hardware or software that achieves the result of identifying the data sets or rays that contributed the bad data which caused the artifacts.

The image correcting or post-processing means D includes a forward projector 90 which forward projects the image representation from the image memory means 46 along each of the rays identified as bad by the bad ray identifying means C. Although the forward projector 90 is illustrated as being different hardware from the forward projector in the preferred embodiment of the bad ray identifying means c for simplicity of illustration, it is to be appreciated that the same hardware may be used to achieve both forward projection and backprojection functions. A memory or latch means 92 holds one output forward projected data set from the forward projector 90, which output data set is essentially the data line which was convolved and backprojected initially along the bad ray. However, the forward projected data set is not necessarily perfectly identical to the original data line. Rather, it is more idealized and equivalent to filtered data sets with system homogeneities or irregularities removed. The bad ray identifying means C also enables the gate 82 such that the convolver 40 convolves the forward projected data set with the negative convolution function. The negative convolved data set is backprojected into the image memory 46 substantially subtracting the contribution of the data set which included the bad data that caused the image artifact. After each of the identified bad rays has been synthesized, convolved with the negative function, and backprojected into the image memory, the process may be considered completed and the resultant image displayed or used for diagnostic purposes. It should be appreciated that this process is particularly advantageous when the number of bad rays is relatively small compared to the total number of rays. Note that if all the rays were bad, this procedure would effectively subtract the entire image representation out of the image memory, leaving a null image to display.

Once the data along the bad ray has been identified and subtracted as described above, a further level of correction is achievable by replacing the removed data with interpolated data. To this end, the forward projector 90 again forward projects data along the identified bad ray. The forward projected data set is convolved by the convolver 40 with the positive convolution function, i.e. the convolution function used originally on the raw data set, from the convolution function memory 42. The convolved data set is backprojected by the backprojecting means 44 into the image memory means 46. In this manner, the removed data is replaced with interpolated data. The interpolated data is a combination of data derived from all the pixels of the image representation and is related thereto by the forward projection algorithm, the convolution function, and the backprojection algorithm. When a plurality of rays are bad, it is preferable that all the bad ray data is removed first and then all the bad data is replaced based on data forward projected from the image memory with the bad data subtracted. In this manner, the interpolated replacement data is based on good data. However, in some circumstances, it may be advantageous to work one ray at a time. That is, a bad ray is identified and its data subtracted from the image memory. The same ray is then reconstituted with the forward projection convolution and backprojection technique described above. The forward projection operation to obtain the replacement data is thus based on a more complete image representation, even although some of the data was contributed by other bad rays. The order in which the bad rays are subtracted and replaced varies with the nature of the artifact, the magnitude of the streaks, the degree of error which the bad detector or ray has introduced into the image representation, the number of bad rays or detectors, and the like.

The invention has been described with reference to the preferred embodiment. Obviously, modifications and alterations will be apparent to those of ordinary skill in the art. It is intended that the invention be construed as including all such alterations and modifications insofar as they come within the scope of the appended claims or the equivalents thereof.

Having thus described the preferred embodiments, the invention is now claimed to be:

1. A CT scanner comprising:
   a non-invasive radiographic examination means for examining a region of interest of a subject in the examination region with penetrating radiation;
   a plurality of radiation detectors for detecting radiation that has passed through the examination region and generating electronic data indicative thereof;
   an image processing means for processing sets of the data to generate an uncorrected electronic image representation;
   a malfunctioning detector identifying means for electronically analyzing the uncorrected electronic image representation for image defects caused by data from a malfunctioning detector to derive and produce an indication of said identified malfunctioning detector from the analyzed uncorrected image representation; and,
   an image representation correcting means for operating on the uncorrected image representation in accordance with the identified malfunctioning detector to generate a corrected image representation in which the effects of the data from the identified malfunctioning detector are reduced.

2. A CT scanner comprising:
   a non-invasive radiographic examination means for examining a region of interest of a subject in the examination region and generating electronic data sets indicative thereof;
   a convolver means for convolving the data sets with a convolution function;
   a backprojector for backprojecting the convolved data sets into an image memory to generate an image representation;
   a bad data identifying means including:
      a forward projector means for forward projecting data in the image representation along each of a plurality of rays to form forward projected data sets,
      means for comparing the forward projected data sets with a standard to determine whether each of the forward projected data sets, hence a corresponding data set backprojected along the same ray into the image memory, contains bad data; and
   an image representation correcting means for operating on the forward projected data sets determined to have bad data to reduce the effects thereof, the image correcting means being operatively connected with the comparing means.

3. The scanner as set forth in claim 2 wherein the bad data identifying means further includes a means for generating a gradient image from the image representation, the gradient image having a plurality of pixel values, each gradient image pixel value corresponding to a like pixel value in the image representation, the gradient image pixel values each having one of two preselected values, the forward projecting means being operatively connected with the gradient image means such that the gradient image is forward projected to generate the forward projected data sets that are compared by the comparing means.

4. The scanner as set forth in claim 3 wherein the image correcting means includes:
   a means for identifying pixel values in the image representation most affected by the data line backprojected along each ray, the means being operatively connected with the comparing means for receiving indications of bad rays therefrom; and,
   a data interpolating means for replacing each data value identified by the means with an interpolated value based on adjacent pixel values.

5. The scanner as set forth in claim 2 wherein the image correcting means includes:
   a means for identifying pixel values in the image representation most affected by the data line backprojected along each ray, the means being operatively connected with the comparing means for receiving indications of bad rays therefrom; and,
   a data interpolating means for replacing each data value identified by the means with an interpolated value based on adjacent pixel values.

6. A CT scanner comprising:
   a non-invasive radiographic examination means for examining a region of interest of a subject in the examination region and generating electronic data sets indicative thereof;
   a convolver means for convolving sets of data from the non-invasive examination means with a selected convolution function;
   a backprojection means for backprojecting the convolved data sets along each of a plurality of rays into an image memory means to generate and electronic image representation;
   a bad data identifying means for electronically analyzing the electronic image representation for image defects caused by bad data and producing an indication of the rays which are degraded by the bad data; and,
   an image correcting means including:
      a forward projecting means for forward projecting image data from the image memory means along a ray identified as a bad data ray by the bad data identifying means, the forward projector means being operatively connected with the convolver means to convey forward projected data sets thereto,
      a means for providing a negative of the convolution function to the convolver means such that forward projected data sets are convolved with the negative convolution function and backprojected along the identified bad data ray direction into the image memory means, whereby data corresponding to bad data is effectively subtracted from the image memory means.

7. The scanner as set forth in claim 6 wherein the forward projector means further forward projects data from the image memory after data along an identified bad ray has been subtracted from the image memory means along the identified bad ray, the forward projected data set being conveyed to the convolver means and a means for reconnecting the selected convolution function with the convolver means such that the forward projected data set is convolved with the selected convolution function and backprojected into the image memory means along the identified bad ray, whereby effectively subtracted information is replaced with information interpolated from image memory data values.

8. An apparatus for reducing the effects of image artifacts in diagnostic images, the apparatus comprising:
 a convolver means for convolving sets of diagnostic data with a selected convolution function to generate convolved data sets;
 a backprojecting means for backprojecting the convolved data sets along corresponding rays into an image memory means;
 a forward projector means for forward projecting data from the image memory means along each of a plurality of the rays to generate forward projected data sets;
 a comparing means for comparing each forward projected data set with a standard to determine along which rays defect containing data has been projected; and,
 image correcting means for correcting image data in the image memory means in accordance with the identified rays.

9. The apparatus as set forth in claim 8 further including:
 an index memory means for storing a list of rays containing bad data; and,
 a means operatively connected with the convolver means for correcting data sets in subsequent images to eliminate data identified by the bad ray list as being defective before convolution by the convolving means.

10. The apparatus as set forth in claim 8 further includes a means for generating a gradient image from an image representation in the image memory means, the gradient image having a plurality of pixel values, each corresponding to a like pixel value in the image representation, the gradient image pixel values each having one of two preselected values, the forward projecting means being operatively connected with the gradient image means such that the gradient image is forward projected to generate the forward projected data sets that are compared by the comparing means.

11. The apparatus as set forth in claim 8 wherein the image correcting means includes:
 a forward projecting means for forward projecting image data from the image memory means along a ray identified as a defective data containing ray, the forward projector means being operatively connected with the convolver means to convey forward projected data sets thereto,
 a means for providing a negative of the convolution function to the convolver means such that forward projected data sets are convolved with the negative convolution function and backprojected along the identified defective data containing ray direction into the image memory means, whereby bad data is effectively removed from the image memory means.

12. The apparatus as set forth in claim 8 wherein the image correcting means includes a means for identifying pixel values in the image representation most affected by the data line backprojected along each ray, the means being operatively connected with the comparing means for receiving indications of bad rays therefrom; and,
 a data interpolating means for replacing each data value identified by the means with an interpolated value based on adjacent pixel values.

13. An apparatus for reducing artifact defects in diagnostic images, the apparatus comprising:
 a convolver means for convolving sets of diagnostic image data with a first convolution function;
 a backprojecting means for backprojecting the convolved data sets along corresponding rays into an image memory means;
 a bad data identifying means for identifying rays along which data sets containing bad data have been backprojected into the image memory means;
 a forward projector means for forward projecting data along each ray identified as a ray along which bad data was projected to generate forward projected data sets, the forward projector means being operatively connected with the convolver means for conveying the forward projected data sets thereto;
 a means for supplying a second convolution function to the convolver means, which second convolution function is a negative of the first convolution function such that data sets convolved with the second convolution function and backprojected are substantially the same but of the opposite sign as data convolved with the first convolution function and backprojected such that the convolving means convolves the forward projected data sets with the second convolution function and the backprojecting means back projects the data set convolved with the second convolution function along the identified ray into the image memory means, whereby the effects of the data set projected along the identified ray are effectively subtracted from the image representation in the image memory means.

14. The apparatus as set forth in claim 13 wherein the forward projecting means forward projects data from the image memory means along the selected ray a second time after the forward projected data set convolved with the second convolution function has been backprojected along the selected ray into the image memory means and further including:
 a means for causing the convolver means to convolve the forward projected data set with the first convolution function and for backprojecting the convolved data set into the image memory means along the identified ray, whereby the effectively subtracted image data is replaced with interpolated image data.

15. The scanner as set forth in claim 13 wherein the bad data identifying means includes:
 a second forward projector means for forward projecting data in the image representation along each of a plurality of rays to form forward projected data sets, a means for comparing the forward projected data sets with a standard to determine whether the forward projected data set, hence a corresponding data set backprojected along the same ray into the image memory means contains bad data.

16. A method of diagnostic imaging, the method comprising:

non-invasively examining the portion of a subject in an examination region with penetrating radiation;

detecting radiation that has passed through the examination region with radiation detectors and generating diagnostic data sets indicative thereof;

processing the sets of the diagnostic data into an uncorrected image representation;

electronically processing the uncorrected image representation to identify diagnostic data sets which contain data attributable to a malfunctioning detector, which malfunctioning detector data results in a malfunctioning detector artifact in a man-readable display of the uncorrected image representation;

utilizing the identification of the diagnostic data sets containing malfunctioning detector data to remove effects of the malfunctioning detector data from the uncorrected image representation creating a corrected image representation, a man-readable display of the corrected image being free from the malfunctioning detector artifact.

17. A method of diagnostic imaging, the method comprising:

non-invasively examining the portion of a subject in an examination region and generating diagnostic data indicative thereof;

convolving the data sets with a selected convolution algorithm;

backprojecting the convolved data sets along rays into the image representation;

forward projecting data from the image representation along each of the plurality of rays to generate forward projected data sets;

comparing the forward projected data sets with a standard to identify data sets that contain bad data;

utilizing the identification of the sets containing bad data to remove effects of the bad data from the image representation.

18. The method as set forth in claim 17 further including before the forward projecting step, creating a gradient image in which each pixel value of the image representation is replaced with one of two preselected values.

19. A method of diagnostic imaging, the method comprising:

non-invasively examining the portion of a subject in an examination region and generating diagnostic data indicative thereof;

convolving the data sets with a selected convolution function to generate convolved data sets;

backprojecting the convolved data sets along rays into the image representation;

identifying rays along which bad data sets were projected into the image representation;

forward projecting data sets from the image representation along rays identified a containing bad data to generate a forward projected data sets;

convolving the forward projected data sets with a negative of the selected convolution function to generate convolved data sets which have data values that are of the opposite sign as data values of a like data set convolved with the selected convolution function; and backprojecting the negative convolution function convolved data set into the image representation, whereby the effects of the identified bad data are reduced.

20. The method as set forth in claim 19 further including after backprojecting the data sets convolved with the negative convolution function into the image representation, forward projecting forward projected data set along the identifying rays, convolving the forward projected data set with the selected convolution function and backprojecting the convolved data sets into the image memory.

* * * * *